United States Patent
Ruprich et al.

(10) Patent No.: US 7,643,596 B2
(45) Date of Patent: Jan. 5, 2010

(54) METHOD AND DEVICE FOR SYNCHRONIZING A MOBILE RADIO RECEIVER WITH A BASE STATION INVOLVING PARALLEL VERIFICATION

(75) Inventors: Thomas Ruprich, München (DE); Steffen Paul, Baierbrunn (DE)

(73) Assignee: Infineon Technologies AG (DE)

( * ) Notice: Subject to any disclaimer, the term of this patent is extended or adjusted under 35 U.S.C. 154(b) by 668 days.

(21) Appl. No.: 11/075,325

(22) Filed: Mar. 8, 2005

(65) Prior Publication Data

US 2005/0163099 A1 Jul. 28, 2005

Related U.S. Application Data

(63) Continuation of application No. PCT/DE03/02561, filed on Jul. 30, 2003.

(30) Foreign Application Priority Data

Sep. 9, 2002 (DE) ................. 102 41 692

(51) Int. Cl.
*H04L 7/00* (2006.01)
(52) U.S. Cl. ...................... 375/357; 370/509
(58) Field of Classification Search ................. 375/354, 375/357, 365, 366, 368; 370/503, 509, 510, 370/513
See application file for complete search history.

(56) References Cited

U.S. PATENT DOCUMENTS

| | | | |
|---|---|---|---|
| 6,480,558 B1 * | 11/2002 | Ottosson et al. ............. | 375/350 |
| 6,865,177 B1 * | 3/2005 | Park et al. .................... | 370/350 |
| 7,020,165 B2 * | 3/2006 | Rakib et al. .................. | 370/485 |
| 2001/0021199 A1 * | 9/2001 | Lee et al. ..................... | 370/503 |
| 2002/0044538 A1 | 4/2002 | Lee ............................. | 370/332 |
| 2002/0057664 A1 | 5/2002 | Sarkar ......................... | 370/342 |
| 2003/0012268 A1 | 1/2003 | Doetsch et al. ............. | 375/149 |
| 2003/0043768 A1 | 3/2003 | Chang et al. ................. | 370/335 |

FOREIGN PATENT DOCUMENTS

| | | |
|---|---|---|
| DE | 694 18 547 T2 | 9/1999 |
| DE | 199 55 757 A1 | 6/2001 |
| WO | WO-00/44117 | 7/2000 |
| WO | WO 00/44117 | 7/2000 |

OTHER PUBLICATIONS

Yin-Pin Eric Wang; "Cell Search in W-CDMA"; IEEE Journal on Selected Areas in Communications, vol. 18, No. 8; pp. 1470-1482, Aug. 2000.
International Search Report (PCT/DE03/02561), Oct. 28, 2003.

* cited by examiner

*Primary Examiner*—Kevin Y Kim
(74) *Attorney, Agent, or Firm*—Dickstein, Shapiro, LLP.

(57) ABSTRACT

In a method for synchronization of a mobile radio receiver to a base station, in which a verification step or a plurality of verification steps is or are also carried out in addition to the synchronization steps and one or more identification step or steps which may be present, at least one of the verification steps is carried out in parallel with a synchronization step and/or with an identification step.

4 Claims, 7 Drawing Sheets

US 7,643,596 B2

METHOD AND DEVICE FOR SYNCHRONIZING A MOBILE RADIO RECEIVER WITH A BASE STATION INVOLVING PARALLEL VERIFICATION

CROSS-REFERENCE TO RELATED APPLICATION

This application is a continuation of copending International Application No. PCT/DE03/02561 filed Jul. 30, 2003 which designates the United States, and claims priority to German application no. 102 41 692.3 filed Sep. 9, 2002.

TECHNICAL FIELD OF THE INVENTION

The present invention relates to a method for synchronization of a mobile radio receiver to a base station and to a corresponding device.

DESCRIPTION OF RELATED ART AND BACKGROUND OF THE INVENTION

When a mobile radio receiver is switched on or when it enters a new cell, it must be synchronized to this cell or to potential cells. In order to associate the received data with the correct time, the data stream is organized in time flames and time slots. A frame contains a specific number of slots, and each slot contains a specific number of bits (data and/or control information). In particular, these cells must first of all be recognized and identified with respect to their timings (flame and slot start) and their base station codes. So-called synchronization sequences are generally used for this purpose, which have either global characteristics (which are the same throughout the network) or local characteristics (which differ for different base stations).

Synchronization of a third generation mobile radio receiver, such as UMTS, to a corresponding base station, that is to say time synchronization and identification of the cell code and scrambling code, is achieved by correlating the received signal with the complex-conjugate signal for the correspondingly transmitted synchronization code.

Since the synchronization sequences generally cannot be received without interference (AWGN), there is only a certain probability of the receiver system being synchronized to a corresponding cell. This synchronization probability depends essentially not only on the signal-to-noise ratio but also on the time interval available for the synchronization procedure. However, user-relevant and/or system-relevant aspects generally result in a link to specific timing requirements. If a synchronization process comprises N step elements (in the case of UMTS, three successive step elements are carried out: slot synchronization→frame synchronization+code group identification→scrambling code identification), then the detection probability after a step element n depends on that of the step element n−1 (n=2, . . . , N).

This results in two conclusions:
a) the step element n−1 should achieve a significantly higher detection probability than the step element n in order to result in an overall procedure with an efficient usefulness/complexity ratio,
b) detection errors/results in a step element should be recognized/evaluated in order to carry out the overall synchronization process with a predetermined detection probability in a minimum time.

As has already been mentioned above, the synchronization procedure for a UMTS mobile radio receiver essentially comprises three step elements:

a) slot synchronization
b) flame synchronization and code group identification
c) scrambling code identification FIG. 2 illustrates a basic flowchart of one such conventional synchronization process for UMTS UEs.

Steps a) and b) in particular require a relatively long time since, in order to increase the detection probability, the received signal must be evaluated (averaged) over a total of two or more slots or even two or more frames. In order to further increase the detection reliability of a synchronization unit such as this, verification steps are normally inserted after one or more of the individual step elements, as is illustrated in FIG. 2. These verification steps must also be carried out over a relatively large number of slots or frames in order to obtain an appropriately reliable indication of the synchronization status of the receiver. This therefore means that additional time is required in order to improve the detection or synchronization probability.

As has already been mentioned above, the 3G system requirements result in specific time restrictions, so that only a specific number of slots or frames are available for a given synchronization task. The detection probability thus depends directly on this restriction. The minimum total detection time or total synchronization time is thus the sum of the slot synchronization time $T_{slot}$, of the slot boundary verification time $T_{veri-slot}$, of the frame synchronization time $T_{frame}$, of the frame verification time $T_{veri-frame}$ and of the scrambling code identification time $T_{scr-id}$. On the assumption that the same time T is required for each step element, this results in a total time of $T_{min-sync}=5T$.

Methods for synchronization with intermediate verification are also referred to as multi-dwell detectors. In this context, reference should be made to the book: Peterson, Ziemer, Borth: Introduction to Spread Spectrum Communication, page 255.

SUMMARY OF THE INVENTION

The invention is based on the object of providing a method for synchronization of a mobile radio receiver to a base station in which, as in the prior art, a verification step or a plurality of verification steps also are carried out in addition to the synchronization steps and one or more identification step or steps which may be present, which, however, is faster than the known methods of this generic type. A further object of the invention is to provide a device for synchronization of a mobile radio receiver to a base station, which device, as in the prior art, is designed such that it also carries out a verification step or a plurality of verification steps in addition to the synchronization steps and, possibly, one or more identification step or steps, and which, however, operates more quickly than known devices of this generic type.

According to the invention, this object can be achieved by a method for synchronization of a mobile radio receiver to a base station, comprising the step of carrying out a verification step or a plurality of verification steps in addition to synchronization steps, which are carried out in a synchronization unit, and one or more identification step or steps which may be present, wherein at least one of the verification steps is carried out in parallel with a synchronization step and/or with an identification step in a verification unit which is provided specifically for this purpose.

Frame synchronization can be carried out after slot synchronization, and the slot synchronization can be verified in parallel with the frame synchronization. Scrambling code identification can be carried out after frame synchronization, and the frame synchronization can be verified in parallel with the scrambling code identification.

The object can also be achieved by a device for synchronization of a mobile radio receiver to a base station, comprising a synchronization unit for carrying out synchronization steps, wherein the device has a dedicated verification unit for carrying out verification steps in parallel.

The device may comprise a slot synchronization unit, a slot boundary verification unit and a frame synchronization unit which are designed such that potential slot boundaries identified by the slot synchronization unit are in each case transmitted to the frame synchronization unit and to the slot boundary verification unit at the same time. The slot boundary verification unit can be a correlator.

BRIEF DESCRIPTION OF THE DRAWINGS

Exemplary embodiments of the invention will be explained in the following text with reference to figures, in which.

DETAILED DESCRIPTION OF EMBODIMENTS

Figure 1:
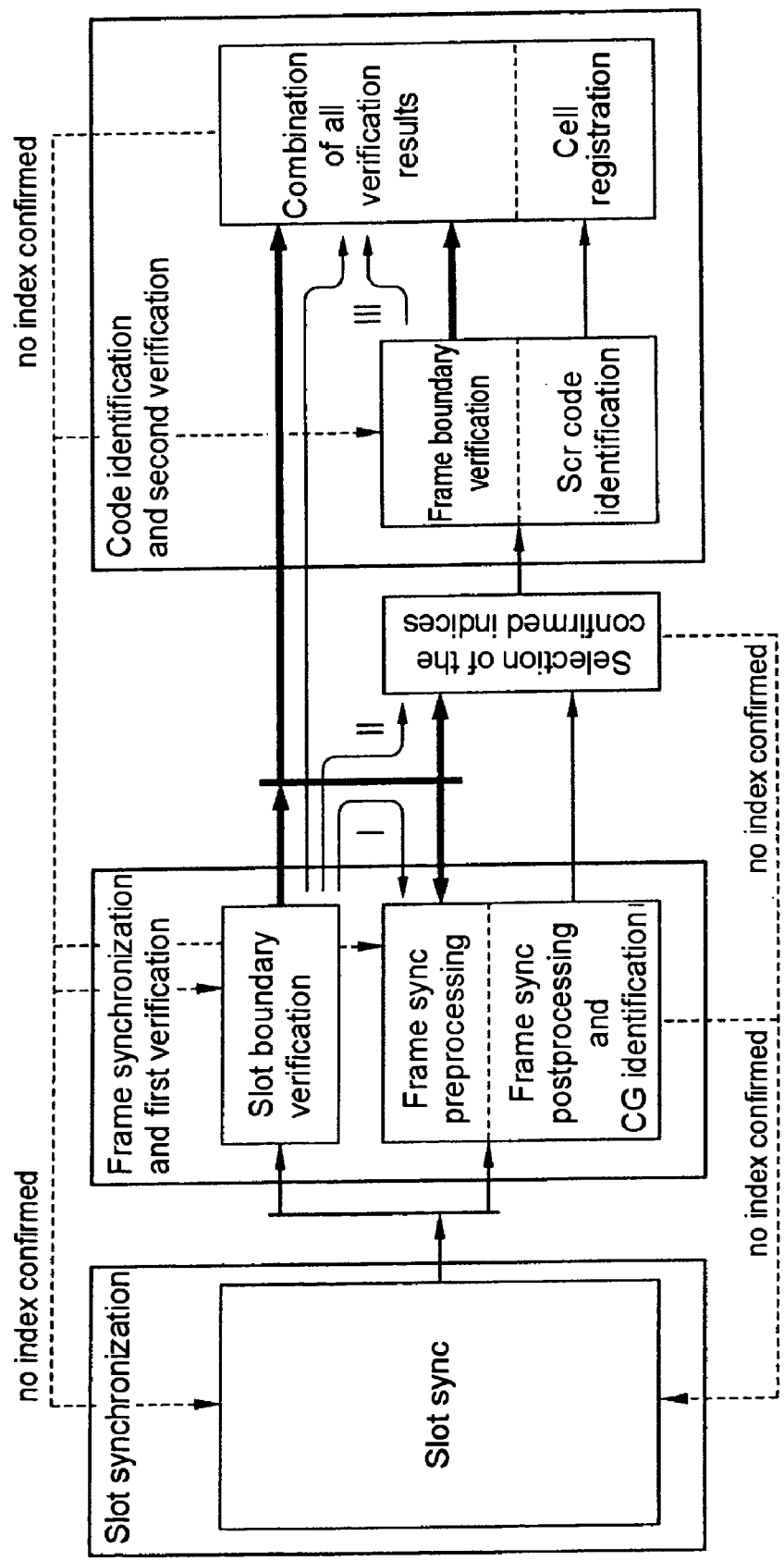
FIG. 1 shows a schematic block diagram of one exemplary embodiment of a synchronization unit according to the invention.
Figure 2:
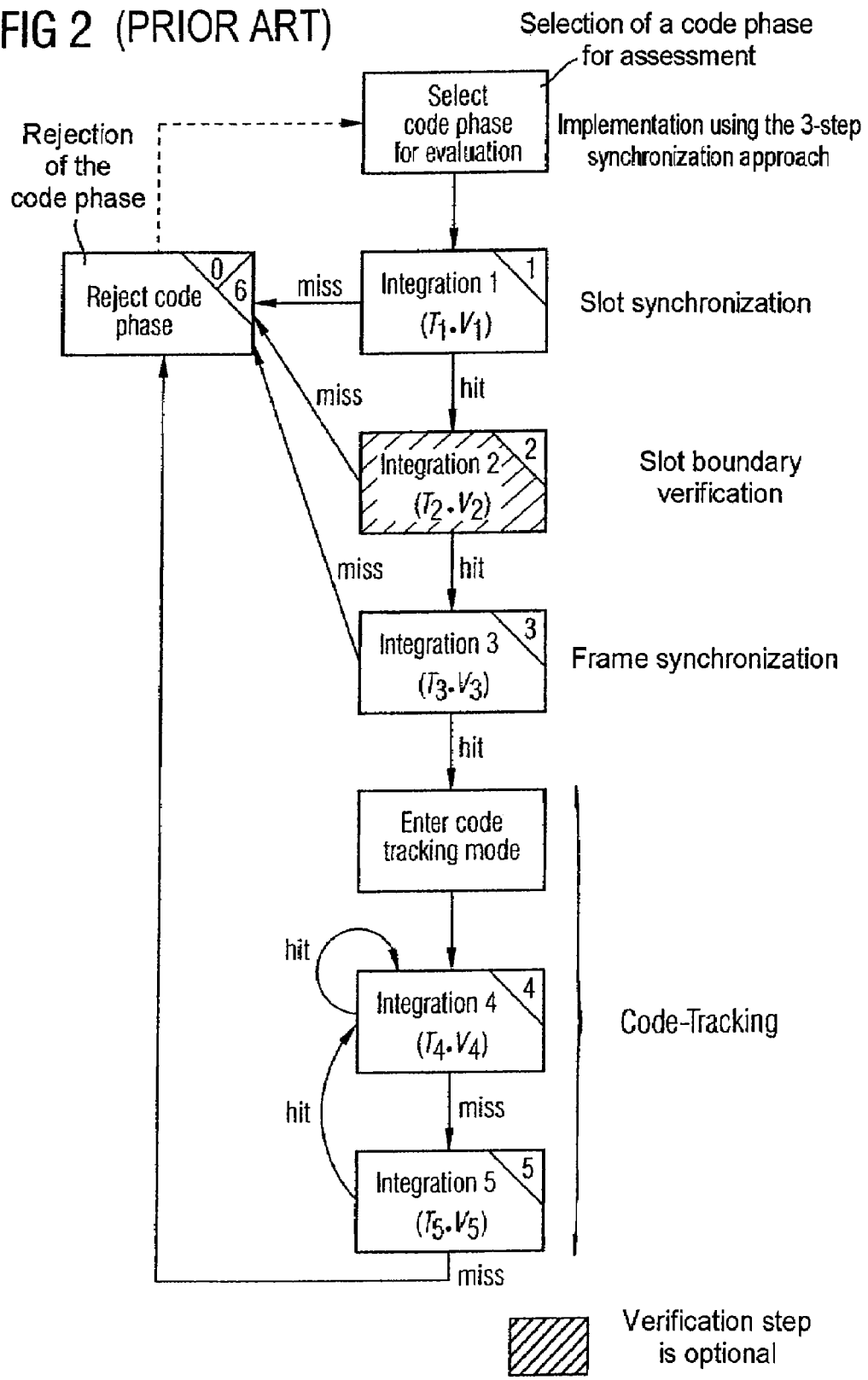
FIG. 2 shows, schematically, the procedure for one synchronization method which is known from the prior art.

FIG. 1 shows, schematically and in the form of a block diagram, the basic functionality and architecture of one exemplary embodiment of a synchronization unit according to the invention. With this approach, the step elements which have already been mentioned of slot synchronization, frame synchronization and scrambling code identification can once again be described as separate block elements. In contrast to the procedure which is known from the prior art, however, no extra verification steps are inserted between the last-mentioned step elements and, instead, the verification steps are carried out in parallel with the respective synchronization step elements. As can be seen from FIG. 1, the status of the slot synchronization, for example, is checked in parallel with the frame synchronization. For this purpose, an additional verification unit which, for example, is formed by a simple correlator is operated synchronously with the frame synchronization unit (see FIG. 3).

"Synchronously" in this case means that only those potential slot boundaries which have been identified by means of slot synchronization were in each case transmitted at the same time to the frame synchronization unit and to the slot boundary verification unit, and are processed in parallel. In consequence, both the verification results for the corresponding slot boundaries and the frame synchronization results are available after only 2T. Reference should be made to the statements relating to this further above with regard to the definition of T.

Figure 3:
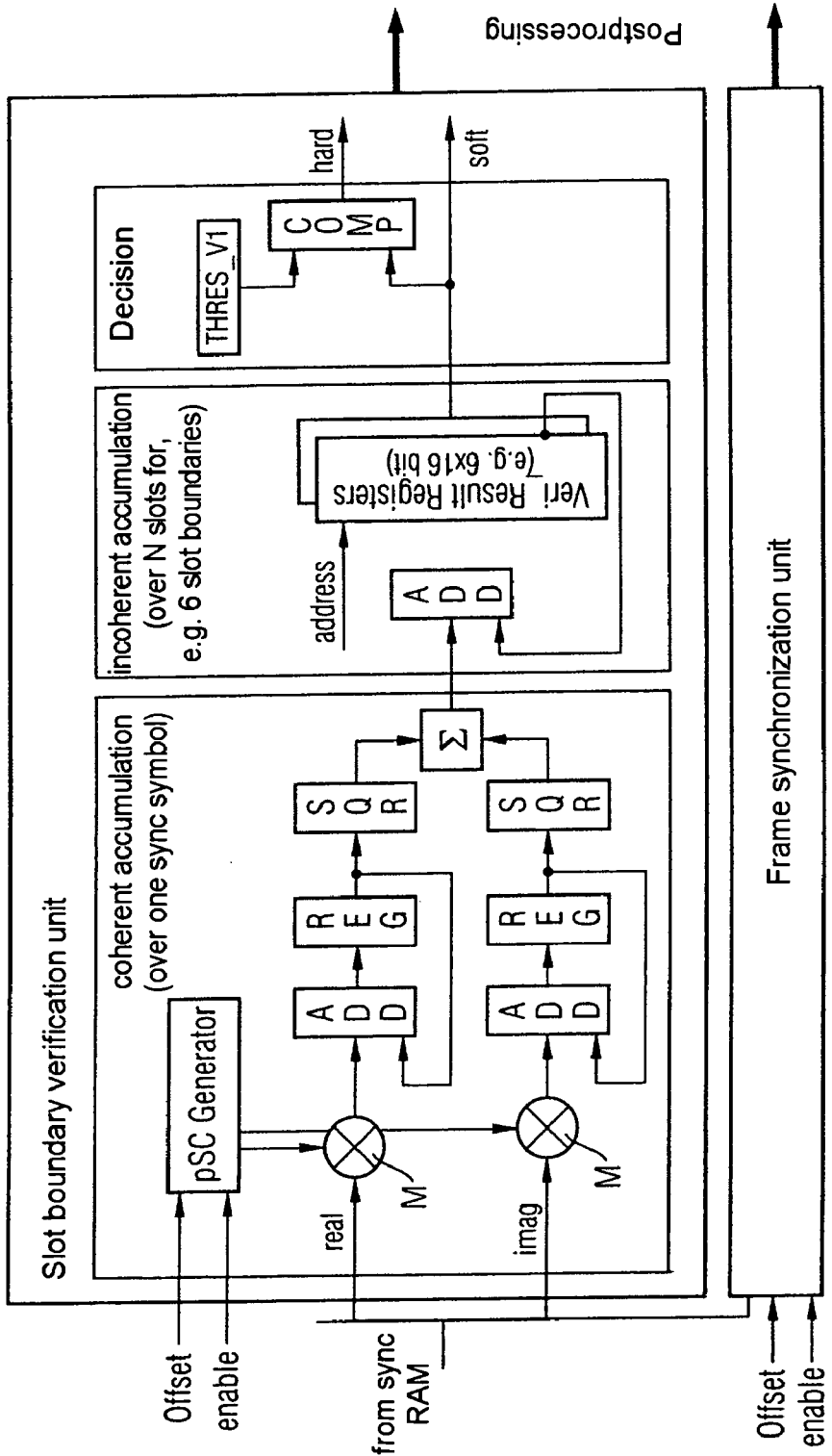
FIG. 3 shows a more detailed section of the block diagram shown in FIG. 1, relating to one exemplary embodiment of a slot boundary verification unit, and of the arrangement of its circuitry with respect to a frame synchronization unit.

As is indicated in FIG. 1, the verification information obtained in this way can be introduced at a number of points in the overall synchronization process. Three options will be described as exemplary embodiments in the following text. This analysis is based on an implementation of the verification unit as shown in FIG. 3. In this case, M denotes a multiplier, ADD an adder, REG a register, SQR a squarer, $\Sigma$ a summation point, and COMP a comparator. An implementation such as this allows coherent and incoherent accumulation of the correlation results, and allows the verification results to be handed over as hard or soft values (FIG. 3). For the implementation of the hard values, the accumulated correlation result is compared with a threshold value THRES_V1. If the accumulated correlation result exceeds the value of THRES_V1, then, by way of example, a "1" is emitted for a positive verification of the corresponding slot boundary (the slot boundary found by the slot synchronization process is confirmed). Otherwise, an "0" is emitted as the verification result, and the slot boundary is not confirmed.

Figure 4:
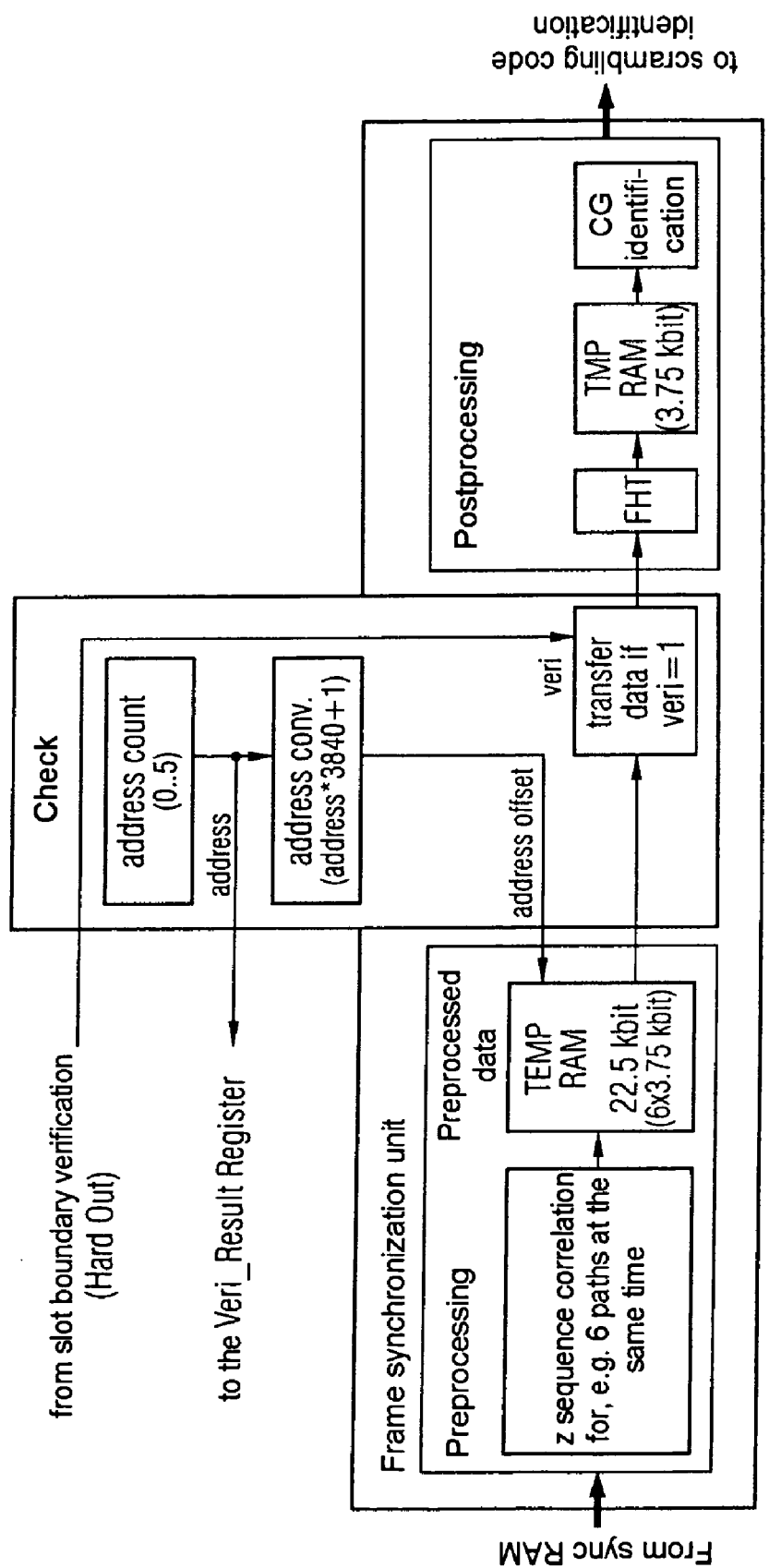
FIG. 4 shows a more detailed block diagram of a first exemplary embodiment of the frame synchronization unit shown in FIG. 3.

Option I:

The basic architecture for this approach is illustrated in FIG. 4.

In this exemplary embodiment, the results of the slot boundary verification process are passed directly to the frame synchronization unit. The input data is subjected to "preprocessing" in the frame synchronization unit, and this is in each case carried out in parallel with the verification of the corresponding slot boundary. This "preprocessing" comprises the correlation of the received data with a so-called "z sequence" (see 3GPP TS 25.213) and the generation of a presequence which comprises 16 values per slot and is temporarily buffer-stored in a RAM (TEMP RAM). A presequence such as this can be generated for each slot boundary that is found by the slot synchronization process. When a slot boundary is confirmed by the verification unit, the corresponding presequence is passed to a postprocessing stage in the frame synchronization unit, and the postprocessing of the frame synchronization and code group identification is carried out for the corresponding slot boundary. Unconfirmed slot boundaries are rejected, that is to say no postprocessing is carried out for them. In this case, it should be noted that the postprocessing does not result in any additional time restriction since only the preprocessing is linked to the received data clock rate, while the postprocessing can be carried out at any desired processing clock rate.

Figure 5:
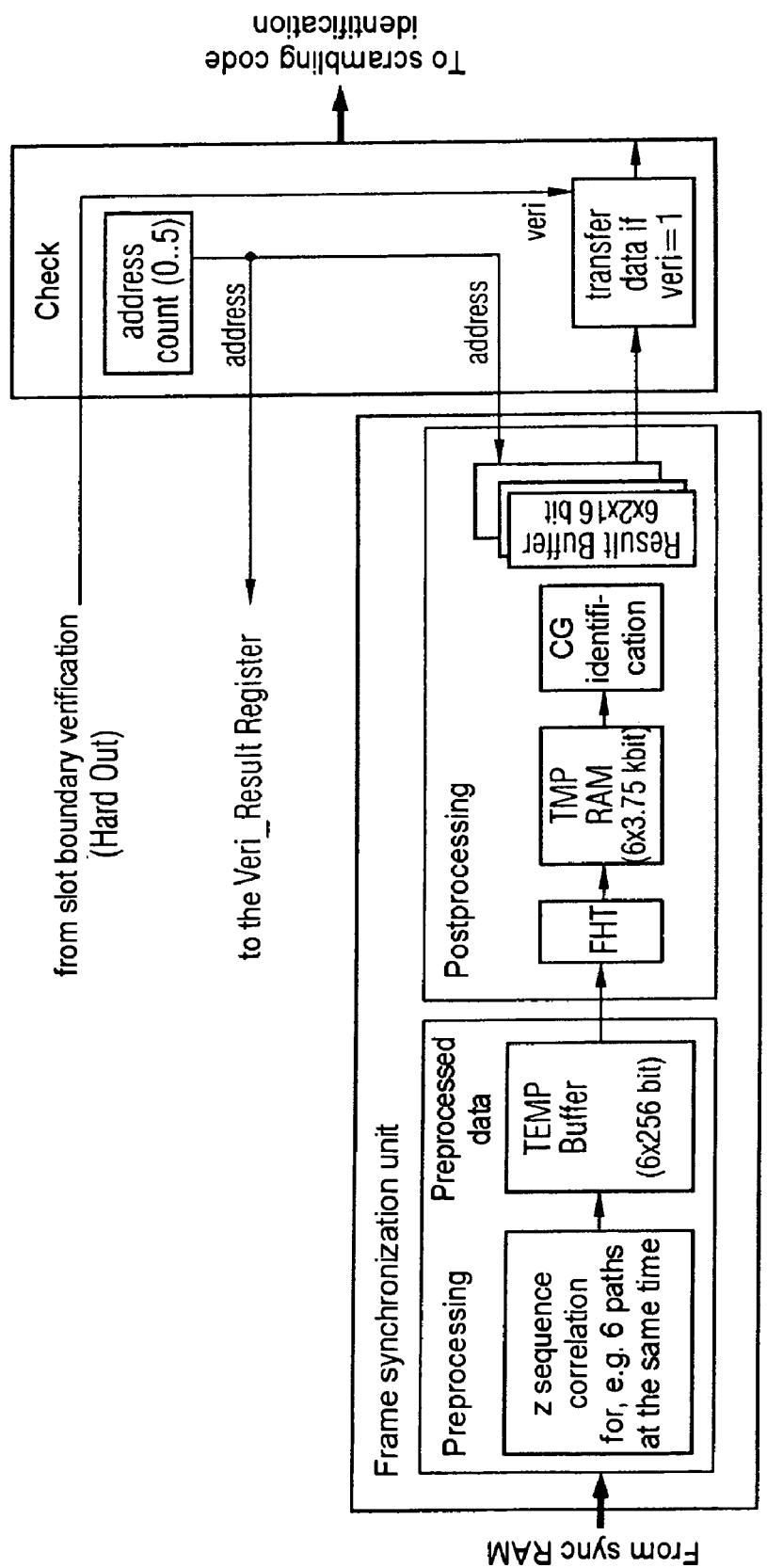
FIG. 5 shows a more detailed block diagram of a second exemplary embodiment of the frame synchronization unit shown in FIG. 3.

Option II:

The basic architecture of this approach is illustrated in FIG. 5.

In contrast to option I above, the frame synchronization process is in this case not subdivided into "preprocessing" and "postprocessing". A complete frame synchronization process is thus carried out in parallel with the verification of the corresponding slot boundary. Once the frame synchronization and code group identification have been carried out, the verification results are also available. Once again, confirmed slot boundaries are processed further, while unconfirmed slot boundaries are in contrast rejected.

In contrast to option I, as described above, both the Hadamard transformation and the code group identification are carried out first of all in the exemplary embodiment based on option II. The results of the slot boundary verification process are not considered until this has been done. Thus, according to option II, computation effort is also appended for unconfirmed slot boundaries.

Figure 6:
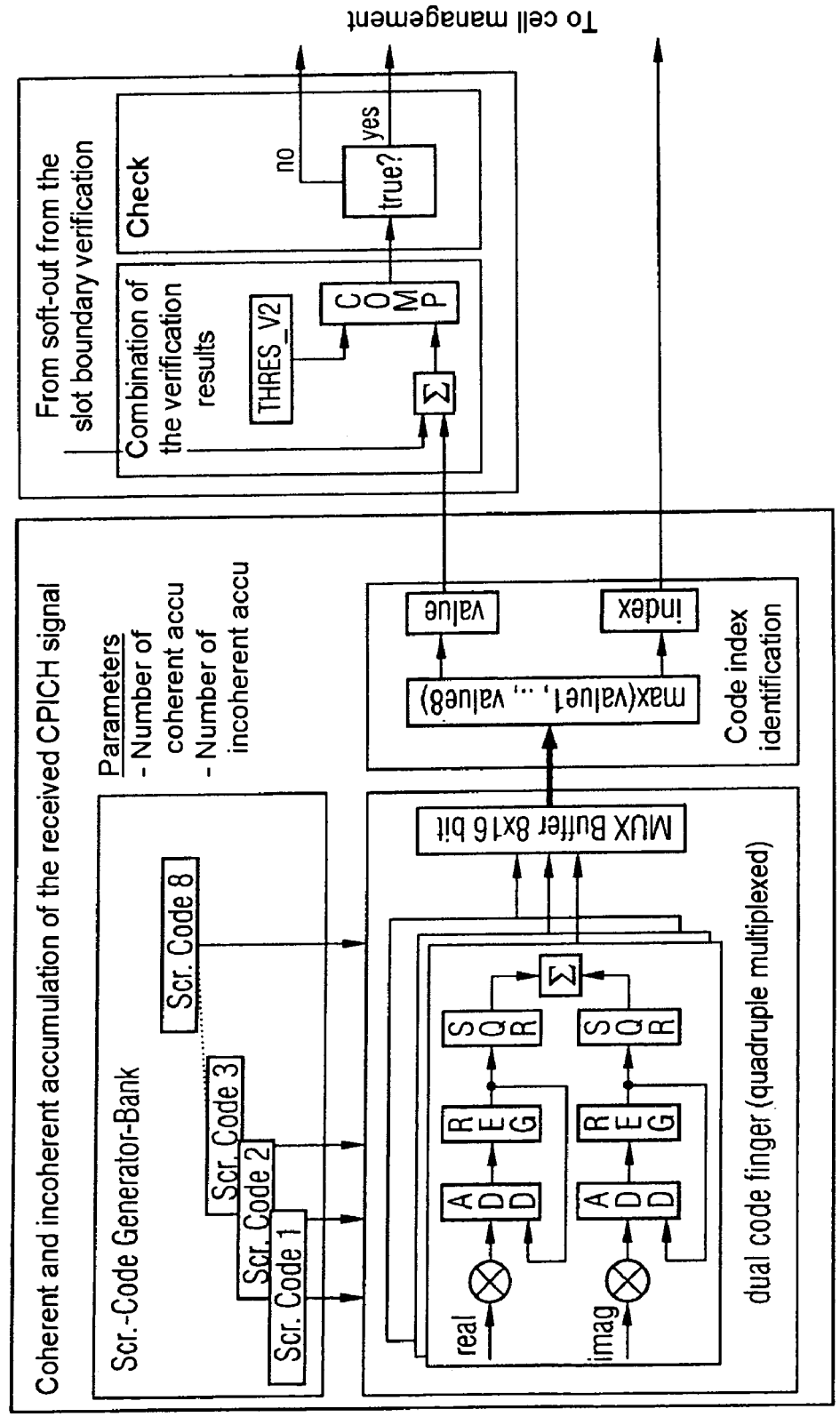
FIG. 6 shows a block diagram as an exemplary embodiment of a combined verification mode.

Option III:

The basic architecture for this approach is illustrated in FIG. 6.

In this implementation option, the results of the slot boundary verification are considered only in the third step element, that is to say only in the scrambling code identification.

The object of scrambling code identification is to detect the valid scrambling code from the eight possible scrambling codes of a code group which has been identified in the "frame synchronization" step element. In this case, by way of example (as is illustrated in FIG. 6), a group of eight rake fingers is loaded with the eight possible scrambling codes, and their outputs are evaluated over a specific number of slots.

The scrambling code for the finger with the greatest output value is that with the highest probability corresponding to the applicable scrambling code. The magnitude of the maximum output value may also be used as a criterion for the reliability of this decision. If this output value is combined with the corresponding soft result from the slot boundary verification (see FIG. 6), then this results in a new value which can be used as a criterion for the overall synchronization result with respect to a specific slot boundary.

If this value is in turn compared with a predetermined threshold value THRESH_V2, then this results, for example, in confirmation of the synchronization result for a "1" and, in a corresponding manner, in rejection for a "0".

One significant advantage of this exemplary embodiment based on option III is the fact that the longer observation time period which is included in the verification result results in a better decision quality with regard to the synchronization status.

The use of the architecture proposed here also makes it possible to verify the synchronization results or corresponding result elements without any additional time being required. In addition, it is even possible to shorten the mean synchronization time, since spurious synchronizations are identified during the synchronization procedure itself, and there is no need to wait for the final result. In contrast, very little additional hardware complexity is involved (a correlator with a corresponding code generator and registers).

In particular, this approach differs from the prior art in that synchronization and verification steps are not carried out successively (serially) but in parallel and ideally synchronously, and the verification results can thus be included in the overall synchronization process in a highly flexible form.

A further exemplary embodiment of the invention comprises a combination of option I, as described above, or of option II, as described above, with option III, as described above.

Figure 7:
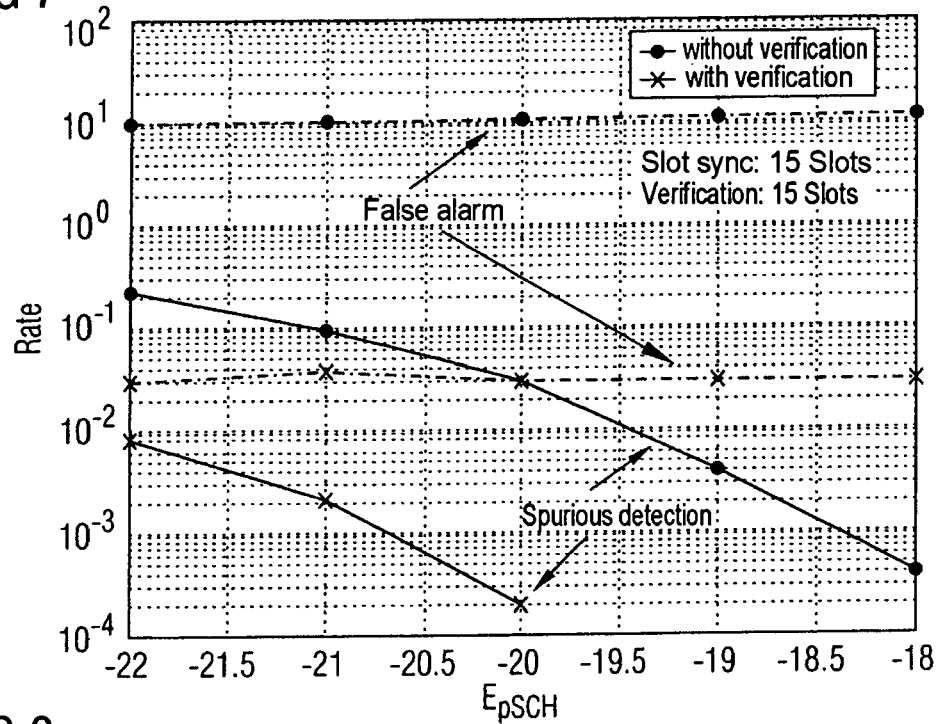
FIGS. 7/8 show a comparison of the detection results for slot synchronization without verification and with verification.
Figure 8:
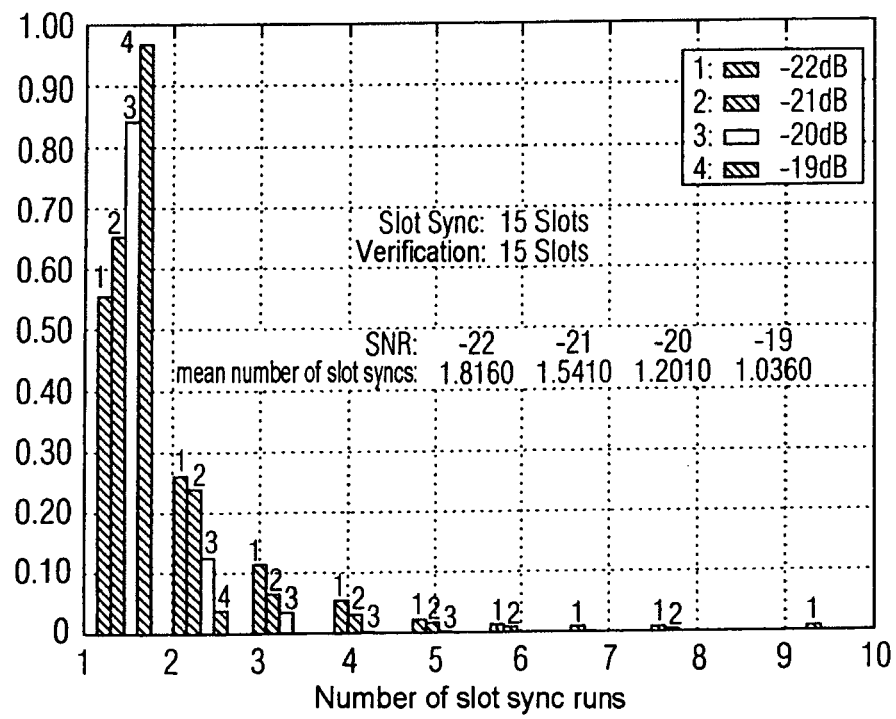

FIGS. 7 and 8 show a comparison of the detection results for slot synchronization without verification and with verification.

As can be seen from FIG. 7, the false alarm rate as well as the rate of incorrectly detected slot boundaries over the entire energy range $E_{pSCH}$ of the first synchronization channel pSCH is significantly (that is to say by several orders of magnitude) higher without verification than with verification.

As can be seen from FIG. 8, the probability of only a single slot synchronization run being required for slot synchronization is more than 50% for all the channel energy levels EPSCH (−22 dB, −21 dB, −20 dB, −19 dB). Four or more slot synchronization runs are required only for a few cases in which the channel energy is low.

We claim:

1. A device for synchronization of a mobile radio receiver to a base station, comprising:
   a synchronization unit configured to carry out synchronization steps;
   a dedicated verification unit configured to carry out verification steps in parallel with the synchronization steps; and
   a slot synchronization unit, a slot boundary verification unit, and a frame synchronization unit, which are designed such that potential slot boundaries identified by the slot synchronization unit are in each case transmitted to the frame synchronization unit and to the slot boundary verification unit at the same time,
   wherein the slot boundary verification unit is configured to output an output parameter of the slot boundary verification to the frame synchronization unit during frame synchronization.

2. The device as claimed in claim 1, wherein the slot boundary verification unit is a correlator.

3. A method for synchronization of a mobile radio receiver to a base station, comprising:
   performing frame and slot synchronization by a synchronization unit, wherein the frame synchronization is carried out after the slot synchronization;
   performing verification of the slot synchronization at the same time as the frame synchronization, by a verification unit which is provided specifically for verification; and
   combining the slot synchronization verification results and the frame synchronization results synchronously.

4. A method for synchronization of a mobile radio receiver to a base station, comprising:
   performing frame synchronization by a synchronization unit;
   performing scrambling code identification after the frame synchronization;
   performing verification of the frame synchronization in parallel with the scrambling code identification, by a verification unit which is provided specifically for verification; and
   combining the frame synchronization verification results and the scrambling code identification results synchronously.

* * * * *